US012491868B2

(12) United States Patent
Khandelwal et al.

(10) Patent No.: US 12,491,868 B2
(45) Date of Patent: Dec. 9, 2025

(54) PATH-CONDITIONED MOTION FORECASTING FOR VEHICLE MOTION PLANNING

(71) Applicant: FORD GLOBAL TECHNOLOGIES, LLC, Dearborn, MI (US)

(72) Inventors: Siddhesh Shyam Khandelwal, Vancouver (CA); William Junbo Qi, Pittsburgh, PA (US); Jagjeet Singh, Pittsburgh, PA (US); Andrew T. Hartnett, West Hartford, CT (US); Deva Ramanan, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 751 days.

(21) Appl. No.: 17/308,721

(22) Filed: May 5, 2021

(65) Prior Publication Data

US 2022/0048503 A1 Feb. 17, 2022

Related U.S. Application Data

(60) Provisional application No. 63/064,598, filed on Aug. 12, 2020.

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
CPC ............ B60W 30/09; B60W 60/0015; B60W 30/0953; B60W 30/0956;
(Continued)

(56) References Cited

U.S. PATENT DOCUMENTS 9,248,834 B1 * 2/2016 Ferguson .............. B60W 30/09
9,428,196 B2 8/2016 Ono
(Continued)

FOREIGN PATENT DOCUMENTS

CN 111428943 A 7/2020
CN 111428943 B * 8/2021 .......... G08G 1/0129
(Continued)

OTHER PUBLICATIONS

Lei Zhu, Trajectory Segmentation Map-Matching Approach for Large-Scale, High-Resolution GPS Data, Jan. 1, 2017, Transportation Research Record: Journal of the Transportation Research Board, No. 2645 (Year: 2017).*

(Continued)

*Primary Examiner* — Matthias S Weisfeld
(74) *Attorney, Agent, or Firm* — Frank A. MacKenzie; Brooks Kushman P.C.

(57) ABSTRACT

Systems and methods of determining trajectories of an actor in an environment in which a vehicle is operating are provided. The method includes detecting an actor that may move within a scene in the environment by an object detection system of a vehicle in the environment, determining a kinematic history of the actor, and using context of the scene and the kinematic history of the actor to determine a plurality of reference polylines for the actor. The method further includes generating a contextual embedding of the kinematic history of the actor to generate a plurality of predicted trajectories of the actor, in which the generating conditions each of the predicted trajectories to correspond to one of the reference polylines. The method additionally includes using, by the vehicle, the plurality of predicted trajectories to plan movement of the vehicle.

18 Claims, 10 Drawing Sheets

(51) Int. Cl.
 *B60W 60/00* (2020.01)
 *G06V 20/56* (2022.01)
 *G06V 40/20* (2022.01)

(52) U.S. Cl.
 CPC ......... *B60W 60/0015* (2020.02); *G06V 20/56* (2022.01); *G06V 40/25* (2022.01); *B60W 2420/403* (2013.01); *B60W 2420/408* (2024.01); *B60W 2554/4029* (2020.02); *B60W 2554/4044* (2020.02); *B60W 2554/4045* (2020.02); *B60W 2554/4046* (2020.02); *G06V 2201/07* (2022.01)

(58) Field of Classification Search
 CPC . B60W 2554/4029; B60W 2554/4044; B60W 2554/4045; B60W 2554/4046; B60W 2420/42; B60W 2420/52; G06V 40/25; G06V 20/56; G06V 2201/07
 USPC .......................................................... 701/301
 See application file for complete search history.

(56) References Cited

U.S. PATENT DOCUMENTS

| | | | |
|---|---|---|---|
| 10,019,011 | B1 | 7/2018 | Green et al. |
| 10,268,200 | B2 | 4/2019 | Fang et al. |
| 10,279,734 | B2 | 5/2019 | Bertollini et al. |
| 10,394,245 | B2 | 8/2019 | Li et al. |
| 10,562,538 | B2 | 2/2020 | Lan et al. |
| 10,649,458 | B2 | 5/2020 | Sun et al. |
| 10,656,657 | B2 | 5/2020 | Djuric et al. |
| 2017/0327112 | A1* | 11/2017 | Yokoyama ........ B60W 50/0097 |
| 2018/0120859 | A1 | 5/2018 | Eagelberg et al. |
| 2019/0129436 | A1 | 5/2019 | Sun et al. |
| 2019/0210591 | A1 | 7/2019 | Low et al. |
| 2019/0333373 | A1* | 10/2019 | Fang ................ G08G 1/096775 |
| 2020/0011693 | A1 | 1/2020 | Yoo et al. |
| 2020/0023838 | A1 | 1/2020 | Zhang |
| 2020/0110416 | A1 | 4/2020 | Hong et al. |
| 2020/0174481 | A1 | 6/2020 | Van Heukelom et al. |
| 2021/0107476 | A1 | 4/2021 | Cui |
| 2021/0129871 | A1* | 5/2021 | Malla ........................ G06T 7/70 |
| 2021/0269059 | A1 | 9/2021 | Djuric et al. |

FOREIGN PATENT DOCUMENTS

| | | | |
|---|---|---|---|
| JP | 2019167039 | A | 10/2019 |
| WO | 2020079066 | A1 | 4/2020 |

OTHER PUBLICATIONS

Kun Jiang, A Flexible Multi-Layer Map Model Designed for Lane-Level Route Planning in Autonomous Vehicles, Mar. 12, 2019, Elsevier LTD on behalf of Chinese Academy of Engineering and Higher Education Press Limited Company, Engineering 5 (2019) 305-318 (Year: 2019).*

Ming Liang, Learning Lane Graph Representations for Motion Forecasting, Jul. 27, 2020 (Year: 2020).*

International Search Report and Written Opinion issued Dec. 10, 2021 in Application No. PCT/US2021/045257.

U.S. Appl. No. 17/308,688, filed May 5, 2021, Waypoint Prediction for Vehicle Motion Planning.

Information about Related Patents and Patent Applications, see section 4 of the accompanying Information Disclosure Statement Letter, which concerns Related Patents and Patent Applications.

Extended European Search Report of European patent application 21856525.7 dated Jul. 8, 2024, 9 pages.

Gao Jiyang et al., "VectorNet: Encoding HD Maps and Agent Dynamics From Vectorized Representation", 2020 IEEE/CVF Conference On Computer Vision and Pattern Recognition (CVPR), IEEE, Jun. 13, 2020 (Jun. 13, 2020), pp. 11522-11530, XP033805513, DOI: 10.1109/CVPR42600.2020.01154 [retrieved on Aug. 3, 2020].

Yichuan Charlie Tang et al., "Multiple Futures Prediction", Arxiv. org, Cornell University Library, 201 Olin Library Cornell University IthacA, NY 14853, Nov. 4, 2019 (Nov. 4, 2019), XP081524830.

Rhinehart Nicholas et al.: "PRECOG: Prediction Conditioned On Goals In Visual Multi-Agent Settings", 2019 IEEE/CVF International Conference on Computer Vision (Iccv), IEEE, Oct. 27, 2019 (Oct. 27, 2019), pp. 2821-2830, XP033723470, DOI: 10.1109/ICCV. 2019.00291.

* cited by examiner

PATH-CONDITIONED MOTION FORECASTING FOR VEHICLE MOTION PLANNING

CROSS-REFERENCE TO RELATED APPLICATIONS

This application claims priority under 35 U.S.C. § 119(e) to U.S. Provisional Application No. 63/064,598, filed Aug. 12, 2020, the disclosure of which is incorporated herein by reference in its entirety.

BACKGROUND

The present disclosure relates to motion forecasting and, in particular, to methods and systems by which an autonomous vehicle or semi-autonomous vehicle may forecast motion of other actors that the vehicle detects while in an environment.

Forecasting or predicting the future states of other actors in complex social scenes is a central challenge in the development of autonomous vehicles (AVs). This is a particularly difficult task because actor futures are multi-modal and depend upon other actors, road structures, and even the AV's intended motion plan. The emergence of large-scale AV testing, together with the public release of driving datasets and maps, has stimulated promising recent work on data-driven feedforward approaches which have been designed to address these challenges.

Most approaches to this problem embed map information within a birds-eye-view (BEV) rasterized image, allowing learned models (typically a combination of convolutional neural networks (CNNs) and recurrent neural networks (RNNs)) to predict trajectories from extracted features. Although convenient, there are some drawbacks to rasterization. These drawbacks include, for example: 1) the resulting models tend to require a relatively large number of parameters; and 2) some facets of the problem are best represented in coordinate spaces that are not conducive to rasterization. For example, while the physics of vehicle motion are generally modeled in Euclidean space, lane-following behaviors and map-based interactions are easier to represent in curvilinear coordinates of the road network. Similarly, social interactions between N actors can be captured naturally in a topological graph representation with N nodes. Notable recent methods VectorNet and SAMMP take such an approach representing individual objects as nodes that may attend to one another.

Until recently, motion forecasting research has primarily focused on pedestrian trajectories, either in the context of first-person activity recognition, sports, or multi-actor surveillance. Popular methods for AV forecasting have employed complex rasterized representations of scene context, constructing Bird's Eye View (BEV) images of the surrounding environment by combining trajectory histories with rich semantic information (e.g., lanes, speed limits, traffic light states, etc.) from maps. Although some of these methods generate all predicted states simultaneously, others employ a recurrent decoder to predict states sequentially, and others still experiment with both approaches.

While several methods incorporate rasterization, issues have arisen regarding rasterization, since there are problems in AV forecasting which cannot be easily represented by matrices of pixels or simple vectors. While the strong benchmark performance of feedforward models is encouraging, safety critical applications may require top-down feedback and causal explainability. For example, because the space of all potential futures in real-world urban driving settings is quite large, real-time planning may require the ability for a planner to interactively probe the forecaster, exploring only those futures that are relevant for planning. Approaches that require re-generation or re-processing of the scene context in order to explore alternate futures may be too inefficient for real-time planning.

For at least these reasons, an effective means of performing AV forecasting without rasterization while predicting multiple states is needed.

SUMMARY

According to an aspect of the present disclosure, a method of determining trajectories of an actor in an environment in which a vehicle is operating is provided. The method includes detecting an actor that may move within a scene in the environment by an object detection system of a vehicle in the environment, determining a kinematic history of the actor, and using context of the scene and the kinematic history of the actor to determine a plurality of reference polylines for the actor. The kinematic history includes a measured path of movement of the actor. Each reference polyline defines a path along which the actor may travel within the scene over a time period according to the context of the scene. The method further includes generating a contextual embedding of the kinematic history of the actor to generate a plurality of predicted trajectories of the actor, in which the generating conditions each of the predicted trajectories to correspond to one of the reference polylines. The method additionally includes using, by the vehicle, the plurality of predicted trajectories to plan movement of the vehicle.

According to various embodiments, the method further includes constructing the predicted polylines from a directed lane graph.

According to various embodiments, using the context of the scene to determine a plurality of reference polylines for the object includes determining a plurality of lane segments along which the actor may travel, and selecting only reference polylines that correspond to lane segments that will not cause the actor to violate a scene context rule.

According to various embodiments, using the kinematic history of the actor to generate a plurality of predicted trajectories is performed by a decoder module.

According to various embodiments, the method further includes predicting a waypoint. The waypoint is a predicted position of the actor at a conclusion of a waypoint time period. According to various embodiments, the method further includes identifying a segment of the reference polyline, the segment extending from a current location to a point along the reference polyline that is closest to the waypoint, and determining a first future trajectory state as a trajectory conditioned by the segment of the reference polyline.

According to various embodiments, using the plurality of predicted trajectories to plan movement of the vehicle includes identifying one or more combinations of locations and times where the first future trajectory state may intersect with a planned trajectory of the vehicle, and causing a motion subsystem of the vehicle to take an action that avoids the identified combinations of locations and times.

According to various embodiments, the one or more actions include altering a path of the vehicle, altering a pose of the vehicle, and/or altering a velocity of the vehicle.

According to another aspect of the present disclosure, a system for determining trajectories of an actor in an environment in which a vehicle is operating is provided. The system includes a vehicle in the environment. The vehicle includes an object detection system configured to detect an actor that may move within a scene in the environment and a computer-readable storage medium. The computer-readable storage medium includes one or more programming instructions that, when executed, will cause the vehicle to determine a kinematic history of the actor and determine a plurality of reference polylines for the actor using context of the scene and the kinematic history. The kinematic history includes a measured path of movement of the actor, and each reference polyline defines a path along which the actor may travel within the scene over a time period according to the context of the scene. The one or more programming instructions, when executed, will further cause the vehicle to generate, using a contextual embedding of the kinematic history of the actor, a plurality of predicted trajectories of the actor, in which the generating conditions each of the predicted trajectories to correspond to one of the reference polylines, and plan, using the plurality of predicted trajectories, one or more movements of the vehicle.

According to various embodiments, the object detection system includes a location sensor, one or more cameras, a LiDAR sensor system, a radar system, and/or a sonar system.

According to various embodiments, the object detection system includes one or more environmental sensors.

According to various embodiments, the environmental sensors include a precipitation sensor and/or an ambient temperature sensor.

According to various embodiments, the computer-readable storage medium further includes one or more programming instructions that, when executed, will cause the vehicle to construct the predicted polylines from a directed lane graph.

According to various embodiments, using the context of the scene to determine a plurality of reference polylines for the object includes determining a plurality of lane segments along which the actor may travel, and selecting only reference polylines that correspond to lane segments that will not cause the actor to violate a scene context rule.

According to various embodiments, the vehicle further includes a decoder module configured to use the kinematic history of the actor to generate a plurality of predicted trajectories.

According to various embodiments, the computer-readable storage medium further includes one or more programming instructions that, when executed, will cause the vehicle to predict a waypoint. The waypoint is a predicted position of the actor at a conclusion of a waypoint time period. According to various embodiments, the computer-readable storage medium further includes one or more programming instructions that, when executed, will cause the vehicle to identify a segment of the reference polyline, the segment extending from a current location to a point along the reference polyline that is closest to the waypoint, and determine a first future trajectory state as a trajectory conditioned by the segment of the reference polyline.

According to various embodiments, using the plurality of predicted trajectories to plan movement of the vehicle includes identifying one or more combinations of locations and times where the first future trajectory state may intersect with a planned trajectory of the vehicle, and causing a motion subsystem of the vehicle to take an action that avoids the identified combinations of locations and times.

According to various embodiments, the one or more actions include altering the path of the vehicle, altering a pose of the vehicle, and/or altering the velocity of the vehicle.

DETAILED DESCRIPTION

Figure 1C:
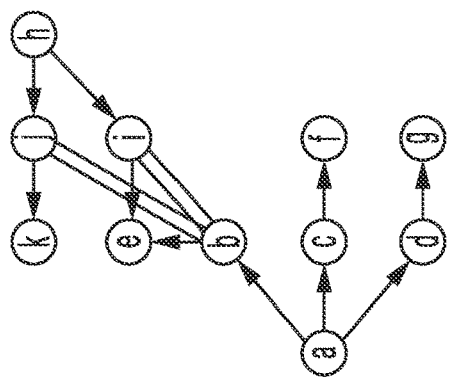
FIG. 1C illustrates a directed graph of lane segments, in accordance with various embodiments of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function. For example, the term "waypoint predictor module" refers to elements of a system in which a processor will execute a set of programming instructions that cause the processor to predict a waypoint of a detected actor in an environment.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "actor" refers to a moving or moveable object that the AV detects in its environment. The term "actor" includes, but is not limited to, vehicles, pedestrians, cyclists, and/or other objects which can move into the AV's path.

When used in the context of AV motion planning, the term "trajectory" refers to the plan that the AV's motion planning system will generate, and which the AV's motion control system will follow when controlling the AV's motion. A trajectory includes the AV's planned position and orientation at multiple points in time over a time horizon, as well as the AV's planned steering wheel angle and angle rate over the same time horizon. An AV's motion control system will consume the trajectory and send commands to the AV's steering controller, brake controller, throttle controller and/ or other motion control subsystem to move the AV along a planned path.

When used in the context of actor motion prediction, a "trajectory" of an actor that a vehicle's perception or prediction systems may generate refers to the predicted path that the actor will follow over a time horizon, along with the predicted speed of the actor and/or position of the actor along the path at various points along the time horizon.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Graph neural networks and graph convolutions have been used in response to rasterization problems prevalent in AV forecasting. The present systems and methods are built upon Graph Attention Networks (GATs) and employ a multi-modal decoder capable of generating diverse predictions.

In various embodiments, systems and methods for applying an RNN-based approach for context-aware multi-modal behavior forecasting are provided. This approach does not require rasterized input and includes both a road-network attention module and a dynamic interaction graph to capture interpretable geometric and social relationships. In contrast to existing graph-based approaches, the present approach includes a model which is structured to efficiently support counterfactual reasoning.

The social context of individual agents can be manipulated in order to condition upon additional hypothetical (unobserved) actors or to ablate specific social influences (see FIG. 6). The present approach incorporates the road network, generating topological goals in the form of lane polylines that are constructed from the underlying directed graph of lane segments (the "directed lane graph"). Importantly, rather than encoding the full local map structure, the present approach explicitly conditions forecasts upon individual topological goals. This allows the planner to reason about and query for relevant trajectories (e.g. "reforecast that actor's motion given the left turn intersecting my path"). In particular, the present approach demonstrated counterfactual forecasts based on topological queries, which is an improvement over existing AV forecasting technologies.

Figure 1B:
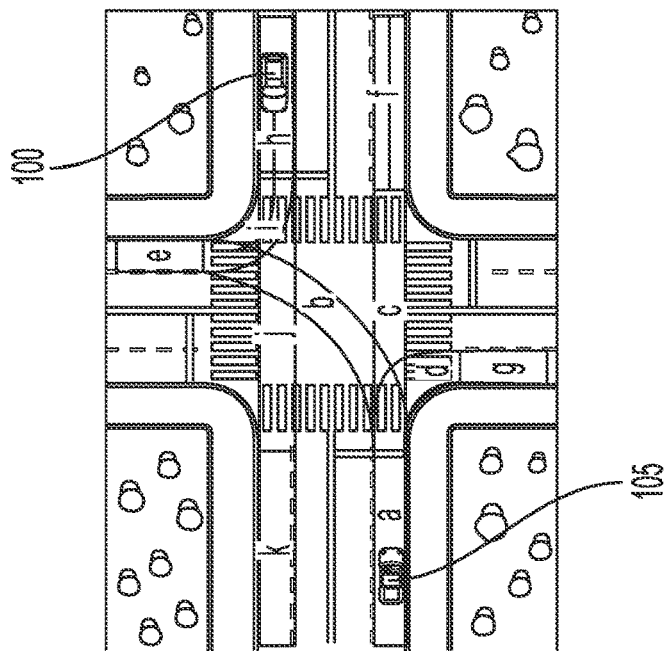
FIGS. 1A-1B illustrate possible predicted trajectories of an actor in an environment, in accordance with various embodiments of the present disclosure.
Figure 1A:
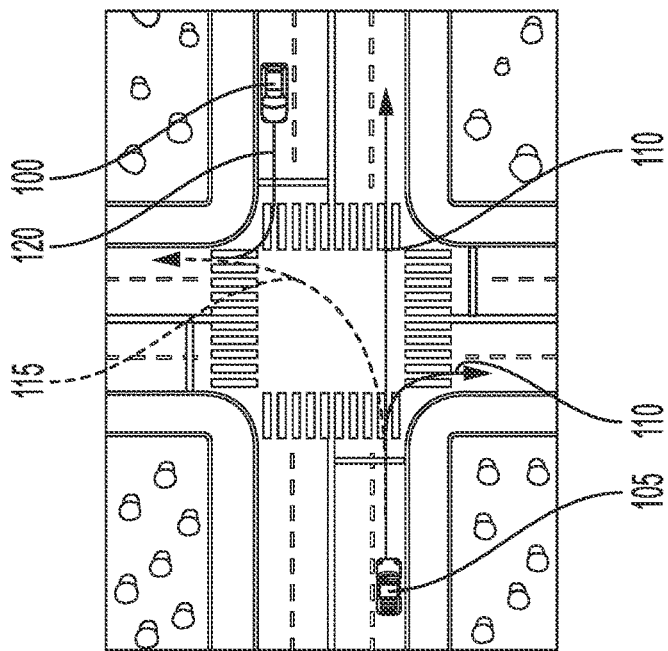

Referring now to FIGS. 1A-1C, possible predicted trajectories of an actor in an environment (FIGS. 1A-1B), and a directed lane graph (FIG. 1C), are illustratively depicted in accordance with various embodiments of the present disclosure.

For any road, direction, or planned course, any of an infinite number of possible futures may occur for a given actor. However, the likelihood of many of these possible futures is remote. While many feasible futures may exist for a given actor, only a small subset may be relevant to the AV's planner. In FIG. 1A, an AV 100 is traveling down a road and has an intended trajectory 120. Across from the AV 100 is an actor 105. According to various embodiments, the AV 100 may include an object detection system configured to analyze all or part of the surroundings of the AV 100. Example elements of an AV, including object detection system elements, will be described below in the discussion of FIG. 8. The object detection system may be configured to identify one or more objects (such as actors which may move, and/or stationary objects) in the environment of the AV 100, determine whether the one or more objects are in motion or have been in motion (i.e., are actors), and/or record the motion of the one or more actors to determine the kinematic history of the one or more actors. Three predicted modes 110, 115 for the actor 105 are determined, with two of the predicted modes being dominant predicted modes 110 and one predicted mode (an illegal left turn) being a non-dominant predicted mode 115. As shown in FIG. 1A, neither of the dominant predicted modes 110 interact with the AV's intended trajectory 120. Therefore, the planner need not consider the dominant predicted modes 110 and needs only to consider an illegal left turn across traffic 115.

As shown in FIG. 1B, a partial set of lane segments within the scene is illustratively depicted as segments a, b, c, d, e, f, g, h, i, j, and k. Illegal maneuvers, such as following segment b (an illegal left turn), can either be mapped or hallucinated by the planner. A centerline (centered polyline) associated with a lane segment is shown in lane segment f (which is illustrated as a dashed line). The planner may identify these segments from a directed lane graph, as shown in FIG. 1C, which identifies lanes that may interact with the AV's 100 intended route. In the directed lane graph, the arrows denote directed edges, while thick undirected edges denote lanes in which the actor's 105 movement may interact with the AV's 100 movement. The actor's 105 predicted lane positions are denoted by nodes a, b, c, d, e, f, and g, the AV's 100 predicted lane positions are denoted by circles e, h, i, j, and k. A predicted lane position in which the actor 105 may interact with (i.e., collide with, or cause a reactive movement by) the AV 100 is denoted by node e, which is included in both the actor's 105 predicted lane positions and the AV's 100 predicted lane positions.

Figure 2:
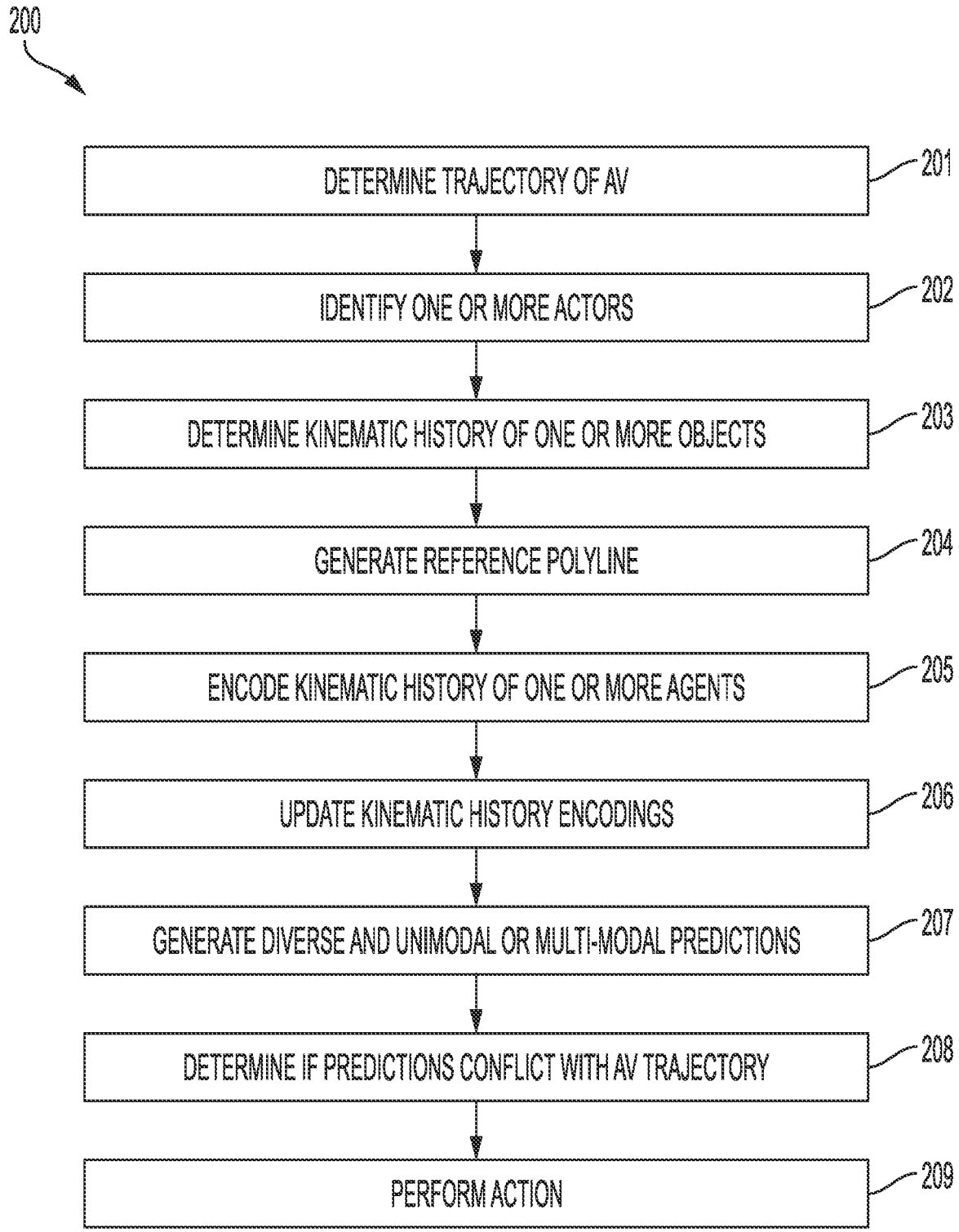
FIG. 2 illustrates a flowchart of a method for forecasting motion of one or more actors, in accordance with various embodiments of the present disclosure.

Referring now to FIG. 2, a flowchart of a method 200 for forecasting the motion of one or more actors is illustratively depicted, in accordance with various embodiments of the present disclosure.

According to various embodiments, the architecture of the present disclosure encompasses a what-if motion predictor (WIMP) model which addresses the task of motion forecasting by learning a continuous-space discrete-time system with N interacting actors. According to various embodiments, the architecture of the present disclosure includes the code set. The code set may be stored on the AV, on a remote server, and/or any other suitable electronic device. Let $x_t^n \in \mathbb{R}^2$ denote the n-th actor's planar (x, y) coordinates at time t, and $X_t = \{x_t^1, x_t^2, \ldots, x_t^N\}$ denote the joint state of all N actors. Let $X_t = \{X_1, X_2, \ldots, X_t\}$ denote the joint observable history up until time t, and $X^n = \{X_1^n, X_2^n, \ldots, X_t^n\}$ represent the entire observable history for actor n. Analogously, let $Y = \{Y_{t+1}, Y_{t+2}, \ldots, Y_{t+T}\}$ denote the joint state of all actors for future time-steps t+1 to t+T. Let $Y_t, Y_n$, and $y_t^n$ be defined accordingly.

Popular approaches for motion forecasting often rely on rasterized representations to provide contextual information about scene and road geometry. The systems and methods of the present disclosure, however, represent a valid path through the road network (directed graph of lane segments) using the concatenated center polylines of each road segment. According to various embodiments, the WIMP model automatically selects candidate polylines based on observed scene context and/or the kinematic history of the one or more actors. Scene context may include a defined set of scene context rules corresponding to social norms and/or legal requirements. For example, if the map data for a scene or legal requirement(s) associated with the geographic location for a scene identifies that a particular turn by an actor would be illegal, or would move the vehicle into a lane that is not permitted, or would move the vehicle too close (within a threshold distance from) another actor, then the system may not select a reference polyline that includes that turn. Thus, the scene context rules and detected or received scene data may identify which road segments will not be considered to be candidate polylines. It is noted, however, that other automatic and/or manual means of selecting candidate polylines may be implemented with the model of the present disclosure.

Conditioning on polyline-based inputs has several advantages over its rasterized counterpart: i) it provides a strong, evidence-based prior for accurate predictions; ii) it allows for interpretable model behavior analysis and enables counterfactual predictions that condition on hypothetical "what-if" polylines; and iii) it leads to more memory efficient models that do not require image-processing components.

According to various embodiments, a trajectory of the AV is determined, at step 201, and one or more actors n are identified, at step 202. The reference polyline that guides actor n is represented as a set of P discrete points $C^n = \{c_1^n, c_2^n, \ldots, c_p^n\}$, where $c_i^n \in \mathbb{R}^2$. The collective set of such polylines for all actors is denoted by $C = \{C^1, C^2, \ldots, C^N\}$. Polyline $C^n$ is obtained by searching the road network along the direction of motion for the highest similarity lane segment to $X_n$. One objective of the present disclosure is to effectively model the conditional distribution Pr(Y|X, C). Though it is possible to model the aforementioned distribution in a joint fashion, it is often intractable and computationally inefficient for large N.

The architecture of the present disclosure employs an RNN-based architecture to sequentially model Pr(Y|X, C). Specifically, it is assumed that the following factorization holds:

$$Pr(Y \mid X, C) = \prod_{\delta=t+1}^{t+T} Pr(Y_\delta \mid Y_{t+1}, \ldots, Y_{\delta-1}, X, C) = \qquad \text{(Equation 1)}$$

$$\prod_{\delta=t+1}^{t+T} \prod_{n=1}^{N} Pr(y_\delta^n \mid Y_{t+1}, \ldots, Y_{\delta-1}, X, C^n)$$

Figure 3A:
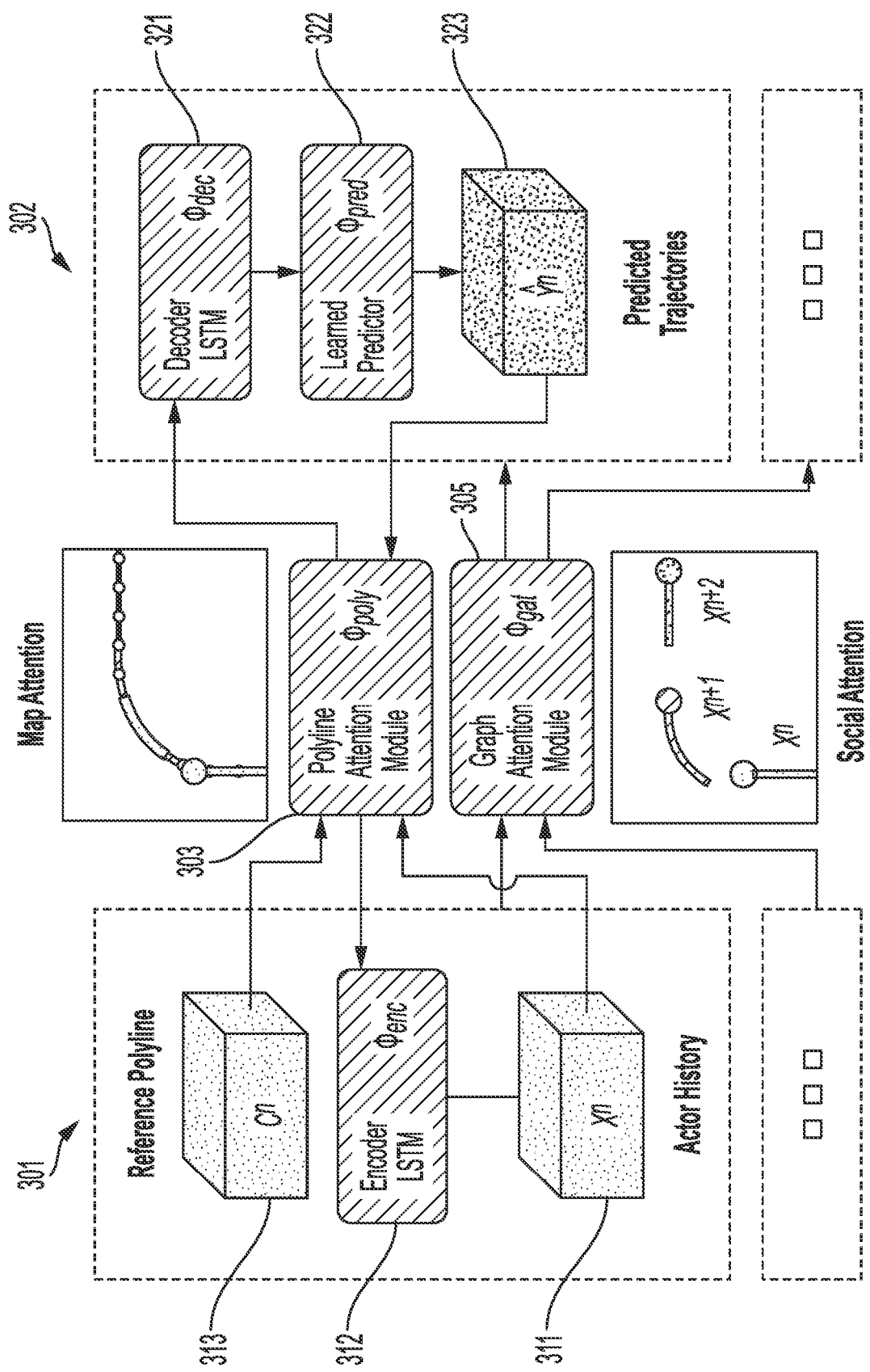
FIG. 3A illustrates an overview of the data flow within a What-If Motion Predictor (WIMP) encoder-decoder architecture, in accordance with various embodiments of the present disclosure.
Figure 3B:
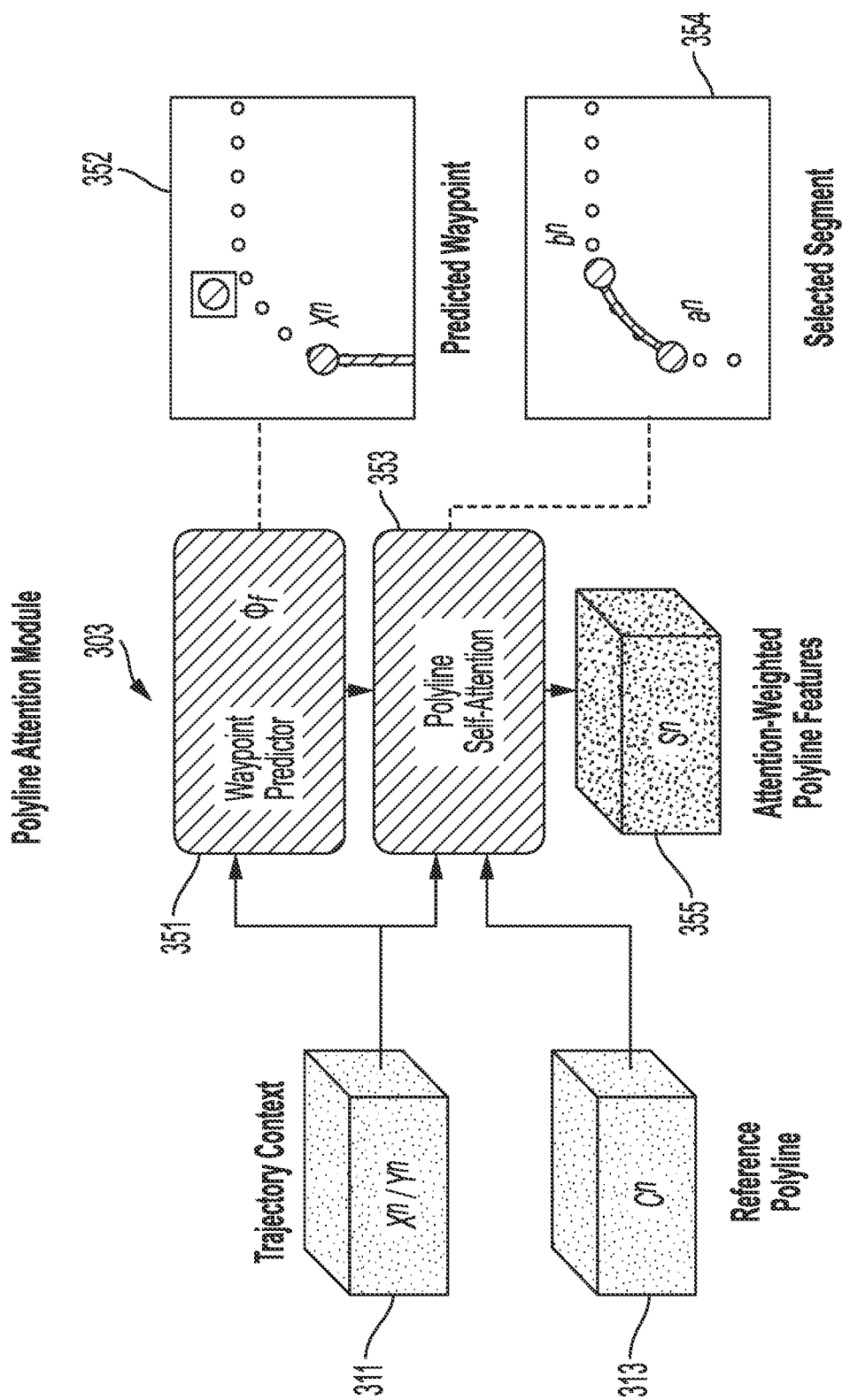
FIG. 3B illustrates an overview of a polyline attention module, in accordance with various embodiments of the present disclosure.

It should be noted that even though Equation 1 factorizes as a product of conditionals over individual actors conditioned on individual polylines, global information regarding other actors and polylines is implicitly encapsulated via the history X and previous predictions $(Y_{t+1}, \ldots, Y_{\delta-1})$. To capture this distribution, a novel recurrent, graph-based, attentional approach is proposed. As shown in FIGS. 2 and 3A-3B the WIMP architecture has at least three key components: i) a graph-based encoder module 301 that captures scene context and higher-order social interactions; ii) a decoder module 302 that generates diverse, multi-modal predictions; and iii) a novel polyline attention module 303 that selects relevant regions of the road network to on which predictions may be conditioned.

As shown in FIGS. 3A-3B, an overview of the data flow within the WIMP encoder-decoder architecture (FIG. 3A), and the polyline attention module 303 (FIG. 3B), are illustratively depicted. Input trajectories and reference polylines are first used to compute per-actor embeddings, and then social context is incorporated via graph attention. Finally, a set of predictions is generated using a map-aware decoder that attends to relevant regions of the polyline via soft-attention.

As shown in FIGS. 2 and 3A, the kinematic history of an actor or object, may be determined, at 203, by a perception subsystem of an AV, using sensors such as LiDAR sensors and cameras. According to various embodiments, a point-of-view transformation $\Gamma(X^n)$ is employed to normalize each actor's history to a reference frame by translation and rotation such that the +x-axis aligns with a focal agent F's heading (such as the AV) and $x_1^F = (0,0)$.

$$h_t^n = \Phi_{enc}(x_t^n, s_t^n, h_{t-1}^n), \text{ in which } s_t^n = \Phi_{poly}(C^n, x_t^n, h_{t-1}^n) \qquad \text{(Equation 2)}$$

As described in Equation 2, each actor n attends to segments of its reference polyline 313 $C^n$ through the learned function $\Phi_{poly}$. Intuitively, drivers pay attention to areas of the road network that they are currently close to, as well as future goal locations that they plan to reach. The polyline attention module 303 $\Phi_{poly}$ operationalizes this intuition by predicting, for each actor n and timestep t, a reference polyline 313, at step 204, and a current and goal index along its polyline:

$$a_t^n = \underset{p}{\mathrm{argmin}}\{d(c_p^n, x_t^n)\}, \quad \text{(Equation 3)}$$

$$\text{in which } b_t^n = \underset{p}{\mathrm{argmin}}\{d(c_p^n, \Phi_f(x_t^n, h_{t-1}^n, \Delta))\}$$

Referring to Equation 3, d(·) is a distance metric and waypoint predictor module 351 $\Phi_f$ is a learned function that hallucinates a coarse waypoint 352 $\Delta$ time-steps in the future. Each of the time-steps may define a waypoint time period. According to various embodiments, a waypoint time period may be, for example, approximately a fraction of a second, a second, a plurality of seconds, and/or other suitable lengths of time. Each actor's contextual history 311 $h_n^t$, at step 203, is captured via a shared recurrent encoder module 312 $\Phi_{enc}$. It should be noted that waypoint predictor module 351 $\Phi_f$ does not make use of any polyline information and predicts the waypoint solely based on kinematic history 311 for each agent or actor, which is encoded at step 205. The waypoint is a predicted position of an agent or actor (which may be an object) at the conclusion of a waypoint time period.

As will be described below, according to various embodiments, one or more future waypoints of the agent or actor may be predicted. During this process, a polyline self-attention module 353 may identify a segment 354 of the reference polyline, the segment extending from a current location to a point along the reference polyline that is closest to the waypoint. One or more future trajectories or trajectory states of an actor may be determined that are conditioned by the segment of the reference polyline.

Training is conducted in a self-supervised manner using ground-truth future trajectories as labels, updating the kinematic history encodings, at step 206, via a social graph or other encodings of other actors. The vectorized attention-weighted representation 355 $s_t^n$ for the segment $\overline{C}_t^n$ between current and goal indices can then be obtained as follows (where Q, V, K are learned transformation matrices):

$$\Phi_{poly}(C^n, x_t^n, h_{t-1}^n) = \sum_{r \in [a_t^n, b_t^n]} v_{tr}^n V c_r^n, \quad \text{(Equation 4)}$$

$$\text{in which } v_{tr}^n = \underset{r}{\mathrm{softmax}}(Q h_{t-1}^n \odot K c_r^n)$$

As encoder module 312 $\Phi_{enc}$ runs independently over all actors, the hidden representation obtained after t time-steps $h_t^n$ for a particular actor n is oblivious to other dynamic participants in the scene. One possible solution is to provide $x_t^i$; $\forall i \neq n$ as an input to Equation 2, but this may be computationally inefficient and memory intensive. Instead of capturing social interactions in the planar coordinate space, the architecture of the present disclosure leverages the ability of encoder module 312 $\Phi_{enc}$ to generate rich latent hidden representations $h_t^n$ for a particular actor n. According to various embodiments, a graph attention module 305 $\Phi_{gat}$ is employed that operates over these representations as follows:

$$\overline{h}_t^n = \sigma\left(h_t^n + \frac{1}{D}\sum_{d=1}^{D}\sum_{j \in N_n} \alpha_{nj}^d w^d h_t^j\right), \quad \text{(Equation 5)}$$

in which $\alpha_{nj}^d = \underset{j}{\mathrm{softmax}}(a^d \odot [w^d h_t^n, w^d h_t^j])$ Referring to Equation 5, D is a hyperparameter denoting the number of attention heads, [·,·] is the concatenation operation, $\odot$ is the inner product, and $W^d$, $a^d$ are learned parameters. For each actor n, the architecture of the present disclosure focuses on learning a residual change to its socially-unaware hidden representation $h_t^n$. Intuitively, this can be thought of as an actor initially having a socially-agnostic estimate of its future trajectory, with $\Phi_{enc}$ learning a residual change to incorporate information from other actors within the scene.

Following Equation 1, WIMP is configured to learn the conditional distribution $\Pr(y_\delta^n | Y_{t+1}, \ldots, Y_{\delta-1}, X, C^n)$ for each actor n. To achieve this goal, a Long Short-Term Memory (LSTM)-based decoder module 321 $\Phi_{dec}$ is employed that: i) generates, at step 207, unimodal or diverse multi-modal predictions (for example, trajectories 323); and ii) conditions each prediction on a reference polyline $C^n$ so that only predicted trajectories that overlap with a reference polyline are considered. Particularly, for a future time-step $\delta$, $y_\delta^n$ is obtained as follows:

$$y_{\delta+1}^n = \Phi_{pred}(o_\delta^n), o_\delta^n, \overline{h}_\delta^n = \Phi_{dec}(Y_\delta, \overline{s}_\delta^n, \overline{h}_{\delta-1}^n), \text{ in which } \overline{s}_\delta^n = \Phi_{poly}(C^n, y_\delta^n, \overline{h}_{\delta-1}^n) \quad \text{(Equation 6)}$$

Referring to Equation 6, $\Phi_{pred}$ is a learned prediction function 322 and $\Phi_{poly}$ is a polyline-attention module 303. The implementation of learned prediction function 322 $\Phi_{pred}$ is architecturally agnostic. For example, learned prediction function 322 $\Phi_{pred}$ could be a bivariate Gaussian or a mixture of Gaussians. For datasets that only evaluate predictions for a single focal actor F, decoder 325 input $Y_\delta$ may only contain predictions for a single actor $y_\delta^F$. However, even in this scenario, WIMP is still able to model social interactions via embeddings $\overline{h}_t^n$ obtained from the graph-based encoder. According to various embodiments, a contextual embedding of the kinematic history of the actor, at 207, is used to generate a plurality of predicted trajectories of the actor, in which the generating conditions each of the predicted trajectories to correspond to one of the reference polylines.

According to various embodiments, based on the unimodal or diverse multi-modal predictions and the conditioned predictions, the WIMP may graphically depict (as a directed lane graph, described above), the predictions and the trajectory of the AV to determine, at step 208, whether any of the multi-modal predictions for each of the actors interacts with the trajectory of the AV. According to various embodiments, determining whether any of the multi-modal predictions interact with the trajectory of the AV may further include determining a likelihood of the interaction. According to various embodiments, if an interacting trajectory is considered likely (e.g., if the likelihood score is above a threshold), the AV, at step 209, performs an action. The action may include altering the path of the AV, altering the velocity of the AV, and/or any other suitable action configured to avoid an interaction with one or more actors.

Figure 4B:
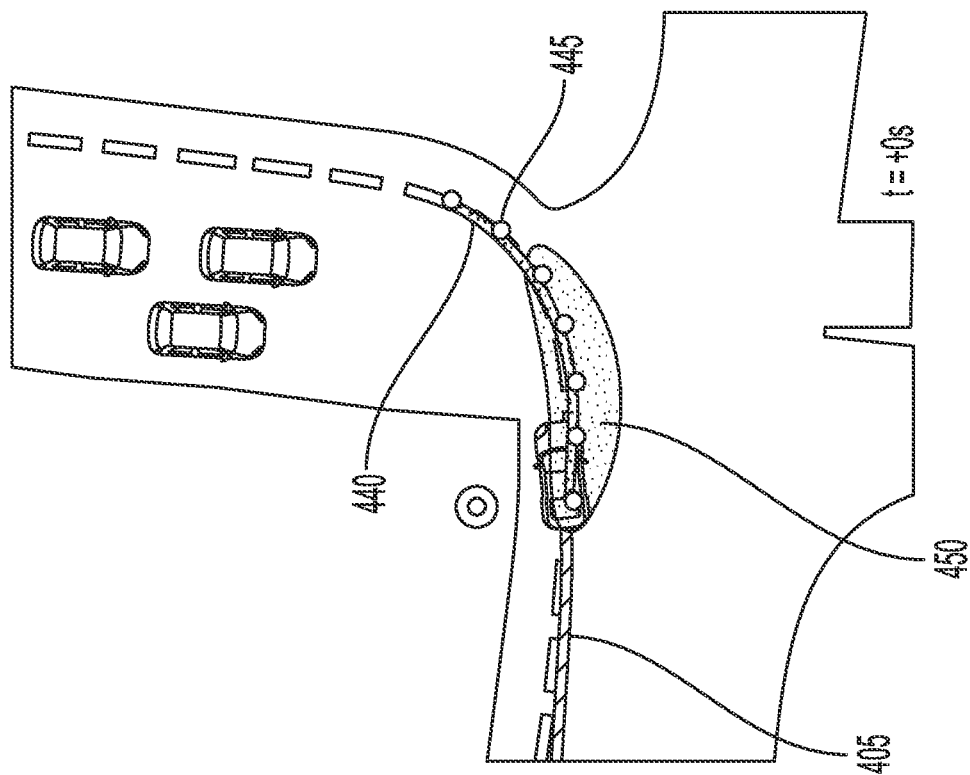
FIGS. 4A-4D graphically depict map lane polyline attention weights which are generated during decoding, in accordance with various embodiments of the present disclosure.
Figure 4A:
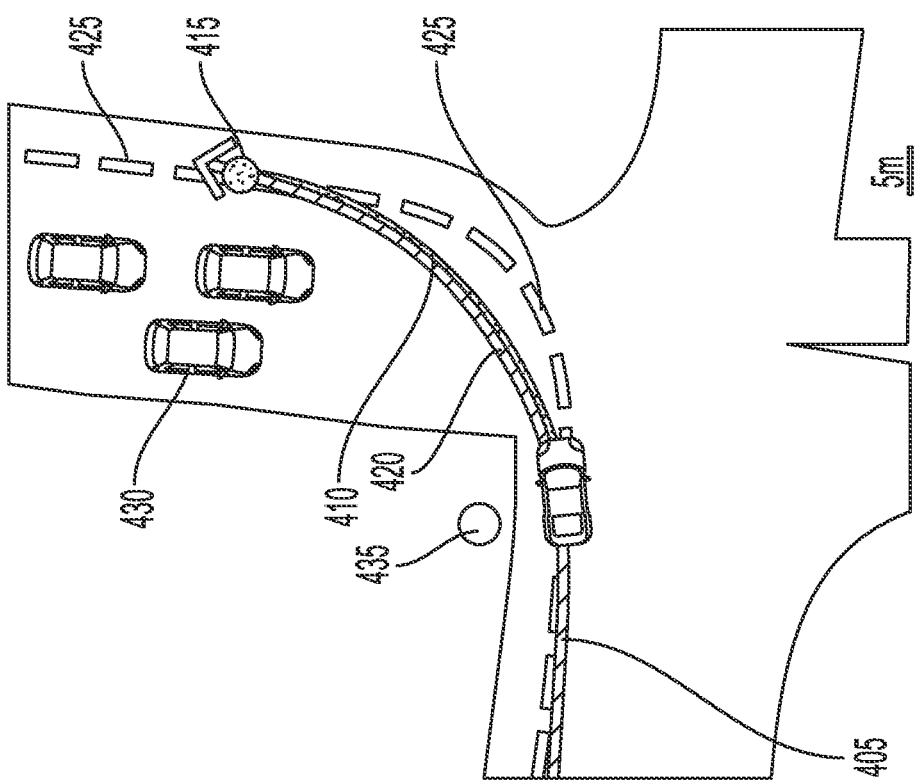
Figure 4D:
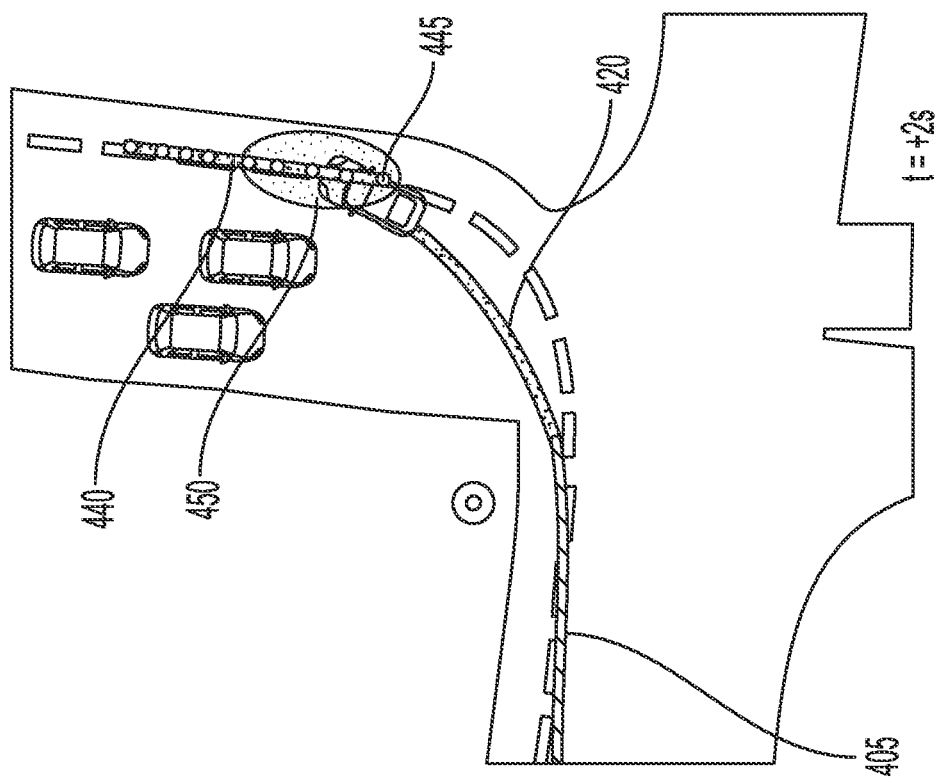
Figure 4C:
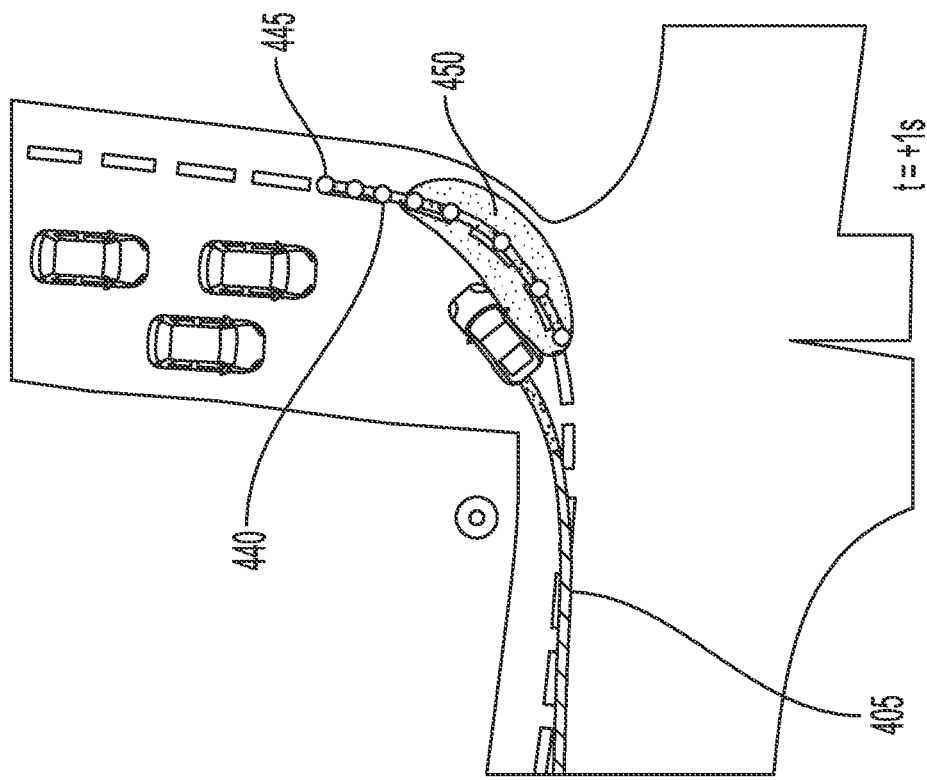
Figure 5A:
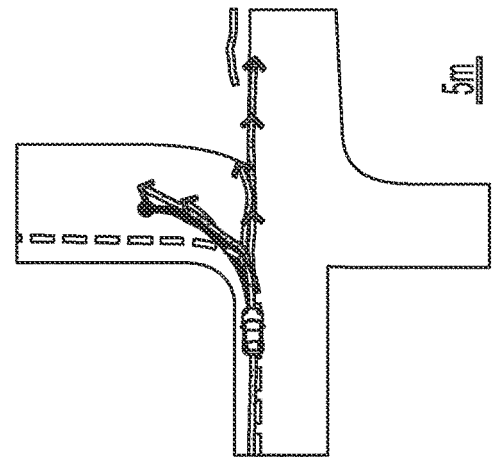
FIGS. 5A-5D illustratively depict visualizations of two prediction scenarios that are conditioned on heuristically-selected polylines and corresponding counterfactual reference polylines, in accordance with various embodiments of the present disclosure.
Figure 5B:
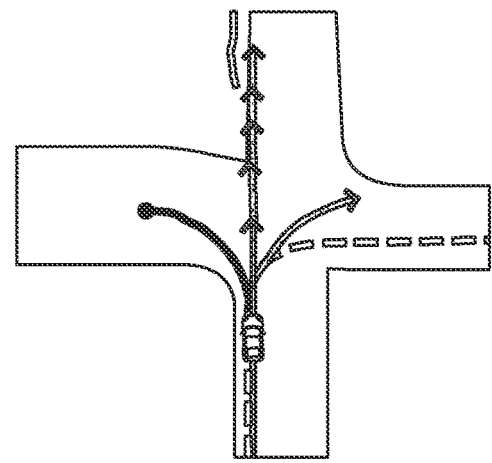
Figure 5C:
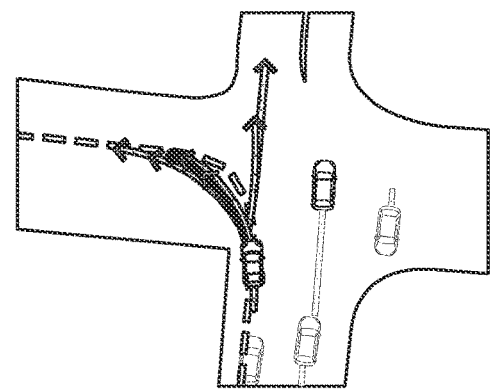
Figure 5D:
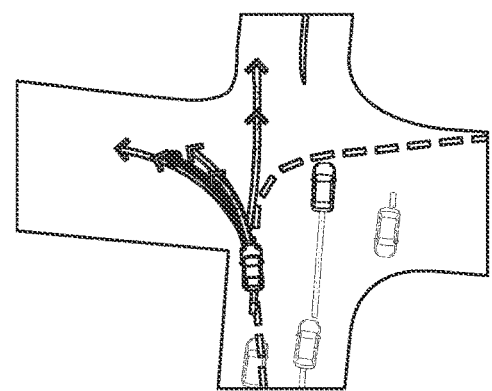

Referring now to FIGS. 4A-4C, visualizations of map lane polyline attention weights which are generated during decoding are illustratively depicted. In the scenario depicted in FIG. 4A, the focal actor's history 405 and its ground-truth future 410 are shown. Circle 415 in FIG. 4A highlights the true state of the actor 3 seconds into the future. Line 420 in FIG. 4A denotes a predicted trajectory with a chevron marking the t=+3 seconds state. The dashed line 425 refers to the reference polyline. Vehicle 430 and circles 435 illustrate the current positions of on-roadway and off-roadway actors. In FIGS. 4B-4D, opacity corresponds to a magnitude of social attention. The subset of the polyline selected by the polyline attention module is shown at 440, while the attention weights on points (black circles) 445 within that segment are shown via an ellipse 450 (for predictions at t=+0 seconds, +1 second, and +2 seconds, respectively). According to various embodiments, WIMP is configured to learn to attend smoothly to upcoming points along the reference polyline.

According to various embodiments, WIMP is trained on collections of triplets containing: historical trajectories; ground-truth future trajectories; and map-based road context $\{(X, Y, C)\}$. Following standard forecasting benchmarks, the future trajectory is only depicted for a single focal agent in each training example, denoted as $Y^F$.

According to various embodiments, to encourage diversity and multi-modality in the set of predicted trajectories, the architecture of the present disclosure is configured to learn a mixture of M different predictors. Diversity is encouraged through a "multiple choice" or "winner-takes-all" (WTA) loss that explicitly assigns each training example to a particular mixture:

$$\text{loss} = \min_{m \in \{1...M\}} \|\hat{Y}_m^F - Y^F\| \qquad \text{(Equation 7)}$$

Referring to Equation 7, $\hat{Y}_m^F$ is the focal trajectory predicted by the $m^{th}$ mixture. Based on experimental data pertaining to distance functions, it has been determined that the L1 norm between trajectories performs well.

By keeping track of the arg min m index for each training example, WTA loss naturally clusters training examples into M sets. Previous work has shown that directly optimizing this loss can lead to poor results because (i) it is difficult to optimize stochastically with mini-batch SGD, as the optimization is sensitive to initialization, and (ii) each mixture can be prone to overfitting, as it is trained with less data. One proposed solution is "evolving WTA" (EWTA), where the single minimum $\min_m$ is replaced with the M' lowest-cost mixtures. Initializing with M'=M, examples are initially associated with all M clusters, encouraging every mixture to generate identical predictions. Over time, as M' is annealed to 1 (resulting in standard WTA loss), iterative specialization of each mixture ensures that each of the final mixtures has been "pre-trained" with the full dataset.

The above produces M different predicted trajectories, which can be fed directly into multi-output forecasting benchmarks that require methods to return M predictions. To repurpose these outputs for single-prediction evaluations, each mixture's accuracy is ranked on a validation set.

Via experimentation, the effectiveness of WIMP at generating accurate, interpretable, and controllable trajectory predictions for roadway actors has been demonstrated. The scene attention encoder is capable of capturing the complex contextual, semantic, and social relationships that are present in real-world urban driving scenarios. According to various embodiments, these learned scene embeddings may be combined with multi-modal decoders to generate a diverse set of plausible future trajectories. Subsequently a series of counterfactual reasoning-based experiments has been performed to demonstrate how the distribution of predicted modes is influenced by scene context.

Experiments were conducted on a motion forecasting dataset having a large scale vehicle trajectory dataset containing more than 300,000 curated scenarios extracted from vehicle logs in urban driving scenarios. Given a 2 second trajectory history as input, the goal was to predict the future motion of a particular focal agent over the next 3 seconds (sampled at 100 ms intervals). In addition to the focal agent history, location histories of nearby (social) actors were provided. Included was a semantic vector map composed of lane-based polylines.

In order to evaluate how WIMP performs in the presence of uncertainty, a small subset (≈350 examples) of particularly challenging scenarios that are characterized by blind turns (defined as examples where the observed 2-second trajectory is straight, but the ground truth future 3-sec. trajectory contains a turn and/or lane change) was extracted from the dataset. Even for recent state-of-the-art methods, the blind turn (BT) subset presents a significant challenge, as generation of high-quality predictions necessitates the incorporation of both social and semantic information to resolve uncertainty.

To evaluate prediction quality, widely adopted forecasting metrics were used: minimum average displacement error (ADE) and minimum final displacement error (FDE), evaluated for both single (K=1) and multi-modal (K=6) prediction scenarios. To capture prediction performance in more challenging scenarios, the miss rate (MR) metric, the fraction of scenarios with FDE>2m, was adopted.

After gathering experimental data, WIMP was compared to several recent state-of-the art (SOTA) methods: SAMMP, UULM-MRM, and VectorNet. Evaluating on the Argoverse challenge test set (results summarized in Table 1), each of these methods was found to be highly competitive, performing far above the bar set by K-NN and LSTM based baselines. Furthermore, from the experimental data, it was determined that WIMP-based models improve upon a multitude of tested technologies by showing improved performance relating to both single and multi-modal prediction-based metrics.

TABLE 1

Motion forecasting performance evaluated on a test set, with MR and minimum FDE/ADE reported for both single (K = 1) and multi-modal (K = 6) prediction scenarios.

| Model | MR (K = 6) | FDE (K = 6) | ADE (K = 6) | FDE (K = 1) | ADE (K = 1) |
|---|---|---|---|---|---|
| SAMMP | 0.19 | 1.55 | 0.95 | 4.08 | 1.81 |
| UULM-MRM | 0.22 | 1.55 | 0.96 | 4.32 | 1.97 |
| NN + Map(Prune) | 0.52 | 3.19 | 1.68 | 7.62 | 3.38 |
| LSTM + Map(Prior) | 0.67 | 4.19 | 2.08 | 6.45 | 2.92 |
| VectorNet | — | — | — | 4.01 | 1.81 |
| WIMP (M = 1) | — | — | — | 3.89 | 1.78 |
| WIMP (M = 6) | 0.17 | 1.42 | 0.90 | 4.03 | 1.82 |

Evaluation in Challenging Scenarios. As an overall dataset may be biased towards simple straight line trajectories, we also evaluated prediction performance on a subset (results summarized in Table 2), which primarily included challenging blind turn scenarios. In this setting, we show that WIMP out-performs non-map-based approaches (such as SAMMP) by a much larger margin than across the full dataset, as polyline and social graph-based attention allows the model to resolve and account for uncertainty even in complex scenarios with multiple feasible future trajectories. In such scenarios, models employing polyline-based coordinate systems, such as LSTM+Map (Prior)), also perform surprisingly well, as the prediction space is strongly conditioned on map information, trading overall performance for better turn prediction results. We note that WIMP is significantly less impacted by this bias-variance trade-off, delivering top performance in both BT and general settings. We also demonstrate that prediction accuracy improves with reference polyline quality. By employing an oracle to select the optimal polyline in hindsight (after observing the future), we observe significant improvements, indicating that WIMP can take advantage of "what-if" polylines provided by such oracles. We analyze this further in the next section.

TABLE 2

Motion forecasting performance evaluated on the blind turn validation data subset. As the selected data is inherently multi-modal, only metrics for (K = 6) predictions are reported.

| Model | MR | FDE | ADE |
| --- | --- | --- | --- |
| SAMMP | 0.67 | 4.91 | 2.38 |
| NN + Map(Prune) | 0.61 | 5.11 | 3.93 |
| LSTM + Map(Prior) | 0.51 | 2.64 | 3.01 |
| WIMP | 0.49 | 3.52 | 3.01 |
| WIMP (Oracle) | 0.33 | 2.46 | 1.30 |

In order to demonstrate how each component of the WIMP architecture contributes to overall prediction performance, an ablation study was performed and the results are summarized in Table 3. The best results were obtained when the model was provided with both map and social context while coupled to a L1-based EWTA loss. Alternative loss formulations were also experimented with. For example, replacing EWTA loss with negative log likelihood (NLL) significantly degrades performance, while standard L1 loss provides impressive (K=1) performance but cannot be adapted to make multiple predictions.

TABLE 3

Ablation studies for WIMP with different input configurations and training objectives. Quantitative results reported for K = 1 and K = 6 metrics on the validation set.

| Context | Loss | MR (K = 6) | FDE (K = 6) | ADE (K = 6) | FDE (K = 1) | ADE (K = 1) |
| --- | --- | --- | --- | --- | --- | --- |
| Map + Social | EWTA | 0.12 | 1.14 | 0.75 | 3.19 | 1.45 |
| Map + Social | L1 | — | — | — | 3.01 | 1.40 |
| Map + Social | NLL | 0.23 | 1.61 | 1.07 | 6.37 | 1.41 |
| Social | EWTA | 0.16 | 1.39 | 0.86 | 5.05 | 1.61 |
| Map | EWTA | 0.16 | 1.38 | 0.85 | 3.80 | 1.69 |
| None | EWTA | 0.23 | 1.70 | 0.95 | 5.86 | 1.87 |

The proposed approach of the present disclosure to conditional forecasting was found to readily support investigations of hypothetical or unlikely scenarios (counterfactuals). This capability can be readily used by a planner to allocate computation to only relevant futures, or to reason about social influences from occluded regions of the road network. Importantly, these counterfactual queries may, additionally or alternatively, be used to investigate and evaluate models beyond distance-based metrics. Sensible predictions conditioned on extreme contextual input indicate that the model of the present disclosure has learned a powerful causal representation of driving behavior and is likely to generalize well (for example, see FIGS. 5 and 6).

Referring now to FIGS. 5A-5D, visualizations of two prediction scenarios that condition on heuristically-selected polylines (shown in FIG. 5A and FIG. 5C), and corresponding counterfactual reference polylines (shown in FIG. 5B and FIG. 5D) are illustratively depicted in accordance with various embodiments of the present disclosure. When making diverse predictions, WIMP is configured to learn to generate some trajectories independent of the conditioning polyline (for example, see the straight through predictions in FIG. 5A and FIG. 5C). Additionally, if the reference polyline is semantically or geometrically incompatible with the observed scene history (as in FIG. 5D, where the counterfactual polyline intersects other actors), the model learns to ignore the map input, relying only on social and historical context.

Figures 6A, 6B:
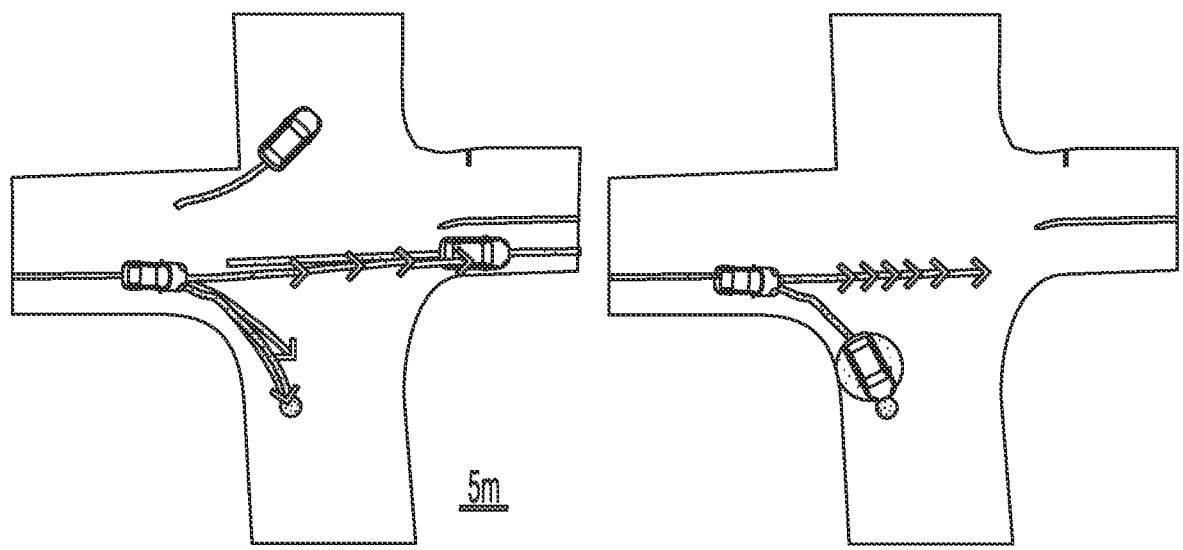
FIGS. 6A-6D illustrate visualizations of two scenarios that condition on ground-truth scene context and counterfactual social contexts, in accordance with various embodiments of the present disclosure.
Figure 6C:
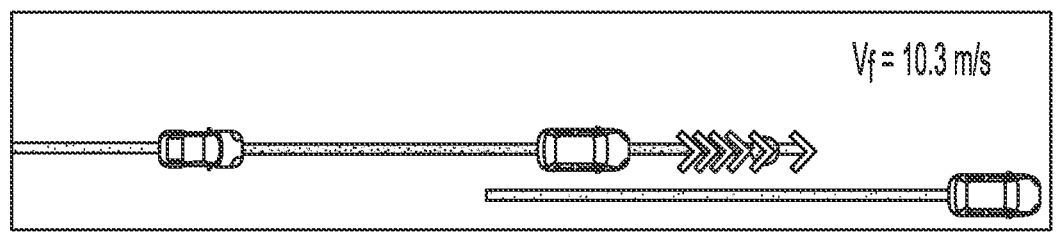
Figure 6D:
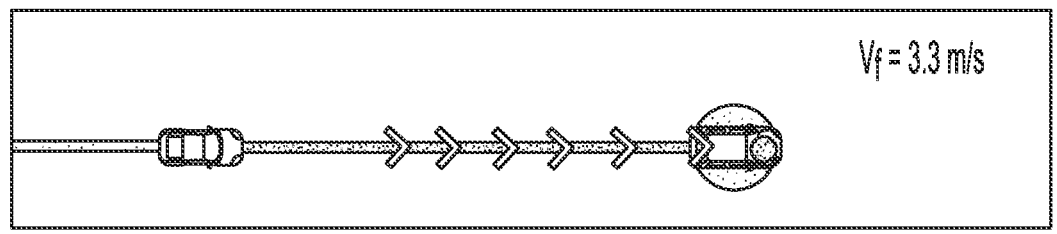

Referring now to FIGS. 6A-6D, visualizations of two scenarios (FIGS. 6A-6B, and FIGS. 6C-6D) that condition on ground-truth scene context (FIG. 6A and FIG. 6C), and counterfactual social contexts (FIG. 6B and FIG. 6D) are illustratively depicted, in accordance with various embodiments of the present disclosure. Counterfactual actors are highlighted with a circles. In FIG. 6B, a stopped vehicle is injected just beyond the intersection, blocking the ground-truth right turn. Given the focal agent's history and velocity, this makes a right turn extremely unlikely, and that mode vanishes. In FIG. 6D, the leading actor shown in FIG. 6C is replaced with a stopped vehicle. As expected, this causes the model to predict trajectories containing aggressive deceleration. In the embodiment shown in FIGS. 6A-6D, the final velocity ($v_f$) of a representative trajectory is 3.3 m/s in the counterfactual setting, compared with 10.3 m/s in the original scene.

The ability to plan, conditioned on the future states of dynamic agents in complex roadway environments is a central challenge to the safe and efficient operation of autonomous vehicles. Progress on the motion prediction problem has downstream consequences for the deployment timeline, scale, and performance of autonomous vehicles as paratransit, long-haul freight, and local delivery options. Implications of the mass deployment of AVs are examined and simulated in an increasing number of economic, public policy, and, most recently, public health papers.

While described in relation to autonomous driving, the WIMP model may be used in other fields or endeavors. For example, according to some embodiments, the WIMP model is configured for prediction of pedestrian trajectories or human actions.

The WIMP model may be run by one or more electronic devices incorporated into an AV and/or any suitable device configured to acquire the visual and social information/data required for planning a route of an AV.

Figure 7:
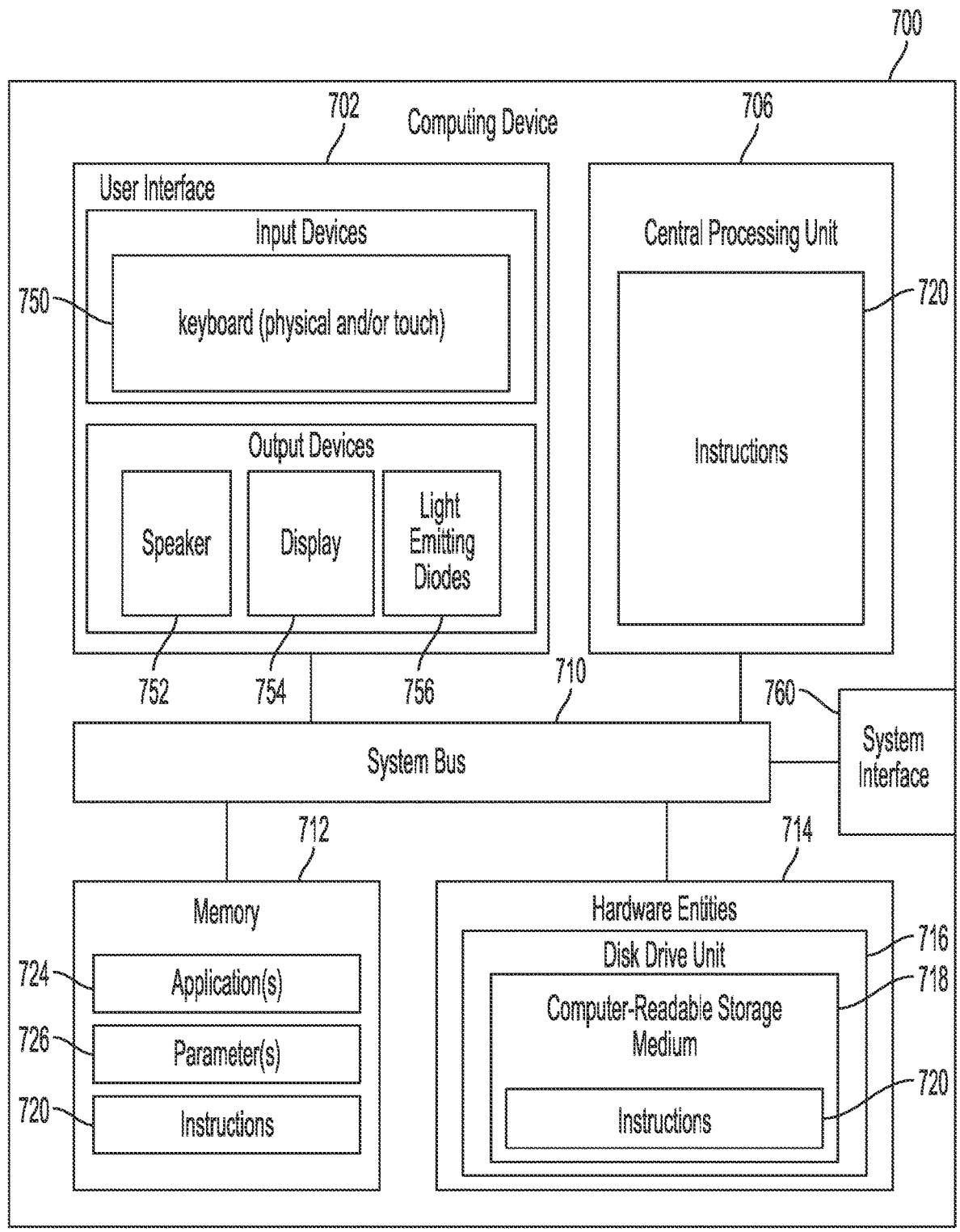
FIG. 7 is an illustration various elements of an illustrative computing device, in accordance with the present disclosure.

Referring now to FIG. 7, there is provided an illustration of an illustrative architecture for a computing device 700. The computing device 700 may be a standalone device, incorporated into an AV or other suitable vehicle or device, a plurality of devices electronically coupled and/or in electronic communication with one another, or other suitable form of electronic device. The computing device 700 may include or be used with an object detection system coupled to the AV, as described above and below in FIG. 8.

Computing device 700 may include more or less components than those shown in FIG. 7. However, the components shown are sufficient to disclose an illustrative solution implementing the present solution. The hardware architecture of FIG. 7 represents one implementation of a representative computing device configured to forecast one or more actors. As such, the computing device 700 of FIG. 7 implements at least a portion of the method(s) described herein. In various embodiments, the computing device 700 includes programming instructions to implement the WIMP encoder-decoder architecture described above.

Some or all components of the computing device 700 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 7, the computing device 700 comprises a user interface 702, a Central Processing Unit ("CPU") 706, a system bus 710, a memory 712 connected to and accessible by other portions of computing device 700 through system bus 710, a system interface 760, and hardware entities 714 connected to system bus 710. The user interface can include input devices and output devices, which facilitate user-software interactions for controlling operations of the computing device 700. The input devices include, but are not limited to, a camera, a motion sensor, a physical and/or touch keyboard 750, and/or other suitable input devices. The input devices can be connected to the computing device 700 via a wired or wireless connection (e.g., a Bluetooth® connection). The output devices include, but are not limited to, a speaker 752, a display 754, and/or light emitting diodes 756. System interface 760 is configured to facilitate wired or wireless communications to and from external devices (e.g., network nodes such as access points, etc.).

At least some of the hardware entities 714 perform actions involving access to and use of memory 712, which can be a random access memory ("RAM"), a disk drive, flash memory, a compact disc read only memory ("CD-ROM") and/or another hardware device that is capable of storing instructions and data. Hardware entities 714 can include a disk drive unit 716 comprising a computer-readable storage medium 718 on which is stored one or more sets of instructions 720 (e.g., software code) configured to implement one or more of the methodologies, procedures, or functions described herein. The instructions 720 can also reside, completely or at least partially, within the memory 712 and/or within the CPU 706 during execution thereof by the computing device 700. The memory 712 and the CPU 706 also can constitute machine-readable media. The term "machine-readable media", as used here, refers to a single medium or multiple media (e.g., a centralized or distributed database, and/or associated caches and servers) that store the one or more sets of instructions 720. The memory 712 may further store applications 724 and parameters 726. The term "machine-readable media", as used here, also refers to any medium that is capable of storing, encoding or carrying a set of instructions 720 for execution by the computing device 700 and that cause the computing device 700 to perform any one or more of the methodologies of the present disclosure.

Figure 8:
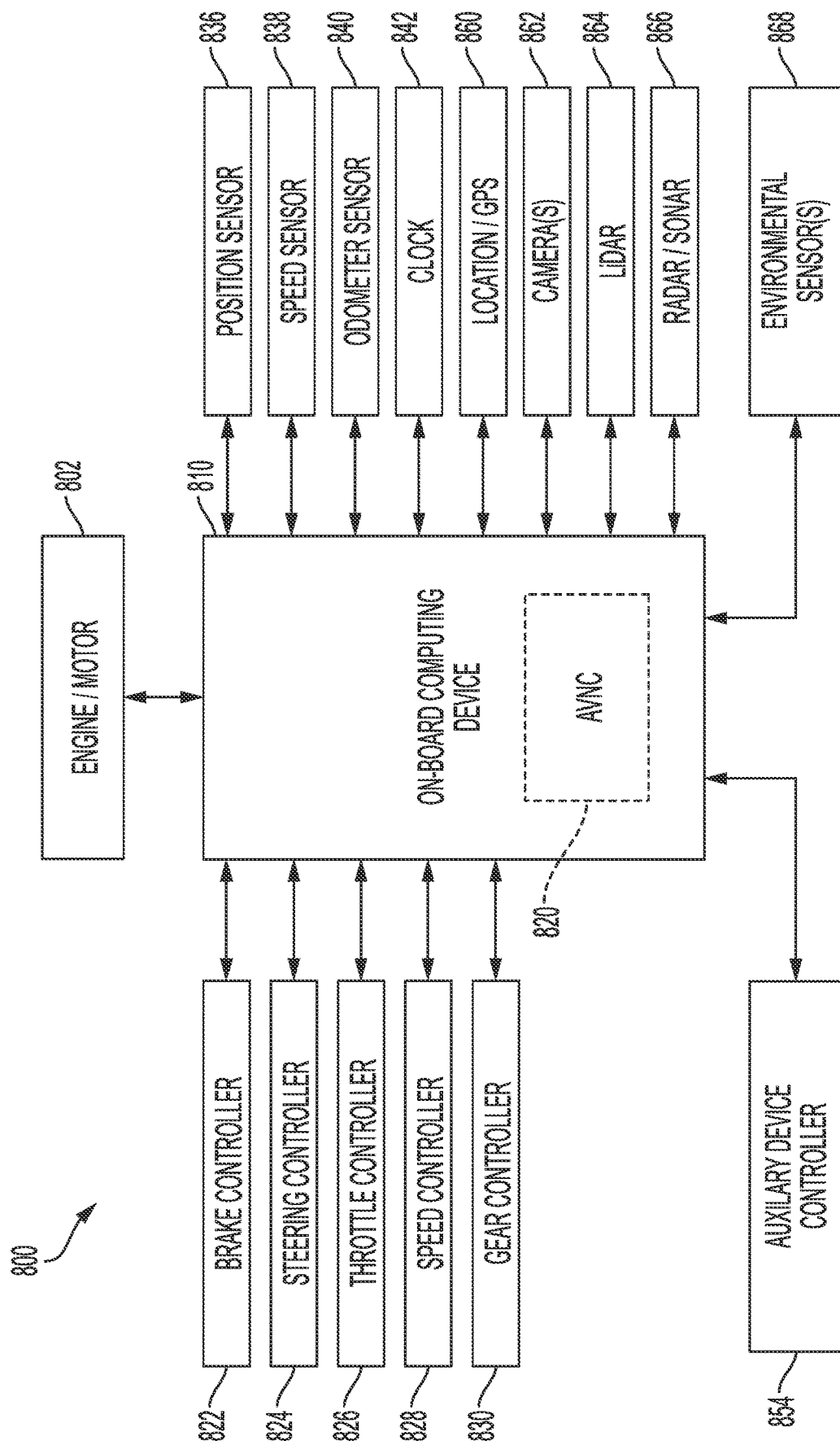
FIG. 8 illustrates example elements of an autonomous vehicle, in accordance with various embodiments of the present disclosure.

FIG. 8 illustrates an example system architecture 800 for a vehicle 100, such as an autonomous vehicle. The vehicle 100 may include an engine or motor 802 and various sensors for measuring various parameters of the vehicle and/or its environment. Operational parameter sensors that are common to both types of vehicles include, for example: a position sensor 836 such as an accelerometer, gyroscope and/or inertial measurement unit; a speed sensor 838; and an odometer sensor 840. The vehicle 100 also may have a clock 842 that the system architecture 800 uses to determine vehicle time during operation. The clock 842 may be encoded into the vehicle on-board computing device 810, it may be a separate device, or multiple clocks may be available.

The vehicle 100 also may include various sensors that, together with a processor and programming instructions, serve as the object detection system that operates to gather information about the environment in which the vehicle is traveling. These sensors may include, for example: a location sensor 860 such as a GPS device; object detection sensors such as one or more cameras 862; a LiDAR sensor system 864; and/or a radar and or and/or a sonar system 866. The sensors also may include environmental sensors 868 such as a precipitation sensor and/or ambient temperature sensor. The object detection sensors may enable the vehicle 100 to detect objects that are within a given distance or range of the vehicle 100 in any direction, while the environmental sensors collect data about environmental conditions within the vehicle's area of travel. The system architecture 800 will also include one or more cameras 862 for capturing images of the environment. Any or all of these sensors will capture sensor data that will enable one or more processors of the vehicle's on-board computing device 810 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 810. The on-board computing device 810 analyzes the data captured by the sensors and optionally controls operations of the vehicle based on results of the analysis. For example, the on-board computing device 810 may control braking via a brake controller 822; direction via a steering controller 824; speed and acceleration via a throttle controller 826 (in a gas-powered vehicle) or a motor speed controller 828 (such as a current level controller in an electric vehicle); a differential gear controller 830 (in vehicles with transmissions); and/or other controllers such as an auxiliary device controller 854. The on-board computing device 810 may include an autonomous vehicle navigation controller 820 configured to control the navigation of the vehicle through an intersection. In some embodiments, the intersection may include traffic lights. In some embodiments, an intersection may include a smart node. In some embodiments, the on-board computing device 810 may be configured to switch modes (augmented perception mode and non-augmented perception mode) based on whether Augmented Perception Data (APD) is available if the vehicle is in-range of an intersection.

Geographic location information may be communicated from the location sensor 860 to the on-board computing device 810, which may then access a map of the environment that corresponds to the location information to determine known fixed features of the environment such as streets, buildings, stop signs and/or stop/go signals. Captured images from the cameras 862 and/or object detection information captured from sensors such as a LiDAR system 864 is communicated from those sensors) to the on-board computing device 810. The object detection information and/or captured images may be processed by the on-board computing device 810 to detect objects in proximity to the vehicle 100. In addition or alternatively, the vehicle 100 may transmit any of the data to a remote server system for processing. Any known or to be known technique for making an object detection based on sensor data and/or captured images can be used in the embodiments disclosed in this document.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A method of determining trajectories of an actor in an environment in which a vehicle is operating, the method comprising:
    by an object detection system of a vehicle that is moving in an environment, detecting an actor that may move within a scene in the environment;
    determining a kinematic history of the actor, wherein the kinematic history includes a measured path of movement of the actor;
    using context of the scene to determine a plurality of reference polylines for the actor, wherein:
        determining the plurality of reference polylines comprises constructing the reference polylines from a directed lane graph,
        the directed lane graph comprises a plurality of edges that each correspond to one or more lanes and nodes that each correspond to a predicted position of an object within the one or more lanes, and
        each reference polyline defines a path along which the actor may travel within the scene over a time period according to the context of the scene;
    generating a plurality of predicted trajectories of the actor using the kinematic history and conditioning each of the predicted trajectories to correspond to one of the reference polylines; and
    by the vehicle,
        using the plurality of predicted trajectories to plan movement of the vehicle; and
        controlling the vehicle based on the planned movement of the vehicle.

2. The method of claim 1, wherein the one or more actions include one or more of the following:
    altering a path of the vehicle;
    altering a pose of the vehicle;
    or altering a velocity of the vehicle.

3. The method of claim 1, wherein using the context of the scene to determine a plurality of reference polylines for the object comprises:
    determining a plurality of lane segments along which the actor may travel; and
    selecting only reference polylines that correspond to lane segments that will not cause the actor to violate a scene context rule.

4. The method of claim 1, wherein using the kinematic history of the actor to generate a plurality of predicted trajectories is performed by a decoder module.

5. The method of claim 1, further comprising:
    predicting a waypoint, wherein the waypoint is a predicted position of the actor at a conclusion of a waypoint time period;
    identifying a segment of the reference polyline, the segment extending from a current location to a point along the reference polyline that is closest to the waypoint; and
    determining a first future trajectory state as a trajectory conditioned by the segment of the reference polyline.

6. The method of claim 1, wherein using the plurality of predicted trajectories to plan movement of the vehicle comprises:
    identifying one or more combinations of locations and times where the first future trajectory state may intersect with a planned trajectory of the vehicle; and
    causing a motion subsystem of the vehicle to take an action that avoids the identified combinations of locations and times.

7. A system for determining trajectories of an actor in an environment in which a vehicle is operating, the system comprising:
    an object detection system configured to detect an actor that may move within a scene in an environment of a vehicle; and
    a computer-readable storage medium comprising one or more programming instructions that, when executed, will cause the vehicle to:
        determine a kinematic history of the actor, wherein the kinematic history includes a measured path of movement of the actor,
        determine a plurality of reference polylines for the actor using context of the scene and the kinematic history, wherein:
            determining the plurality of reference polylines comprises constructing the reference polylines from a directed lane graph;
            the directed lane graph comprises a plurality of edges that each correspond to one or more lanes and nodes that each correspond to a predicted position of an object within the one or more lanes; and
            each reference polyline defines a path along which the actor may travel within the scene over a time period according to the context of the scene,
        generate, using a contextual embedding of the kinematic history of the actor, a plurality of predicted trajectories of the actor and condition each of the predicted trajectories to correspond to one of the reference polylines,
        use the plurality of predicted trajectories to plan one or more movements of the vehicle; and
        control the vehicle based on the planned one or more movements of the vehicle.

8. The system of claim 7, wherein the object detection system includes one or more of the following: a location sensor; one or more cameras; a LiDAR sensor system; a radar system; or a sonar system.

9. The system of claim 7, wherein the object detection system includes one or more environmental sensors.

10. The system of claim 9, wherein the environmental sensors include one or more of the following: a precipitation sensor; or an ambient temperature sensor.

11. The system of claim 7, wherein the instructions to use the context of the scene to determine a plurality of reference polylines for the object comprise-instructions to:

determine a plurality of lane segments along which the actor may travel; and select only reference polylines that correspond to lane segments that will not cause the actor to violate a scene context rule.

12. The system of claim 7, further comprising a decoder module configured to use the kinematic history of the actor to generate a plurality of predicted trajectories.

13. The system of claim 7, wherein the computer-readable storage medium further includes one or more programming instructions that, when executed, will cause the vehicle to:

predict a waypoint, wherein the waypoint is a predicted position of the actor at a conclusion of a waypoint time period;

identify a segment of the reference polyline, the segment extending from a current location to a point along the reference polyline that is closest to the waypoint; and determine a first future trajectory as a trajectory relative to the segment of the reference polyline.

14. The system of claim 13, wherein the instructions to use the plurality of predicted trajectories to plan movement of the vehicle comprise instructions to:

identify one or more combinations of locations and times where the first future trajectory may intersect with a planned trajectory of the vehicle; and cause a motion subsystem of the vehicle to take an action that avoids the identified combinations of locations and times.

15. The system of claim 14, wherein the one or more actions include one or more of the following:

altering the trajectory of the vehicle; or altering the velocity of the vehicle.

16. A non-transitory computer-readable storage medium comprising one or more programming instructions that, when executed, will cause a processor to:

use an object detection system of a vehicle to detect an actor that may move within a scene in an environment around the vehicle;

determine a kinematic history of the actor, wherein the kinematic history includes a measured path of movement of the actor;

determine a plurality of reference polylines for the actor using context of the scene and the kinematic history, wherein:

determining the plurality of reference polylines comprises constructing the reference polylines from a directed lane graph, the directed lane graph comprises a plurality of edges that each correspond to one or more lanes and nodes that each correspond to a predicted position of an object within the one or more lanes, and each reference polyline defines a path along which the actor may travel within the scene over a time period according to the context of the scene;

generate, using a contextual embedding of the kinematic history of the actor, a plurality of predicted trajectories of the actor;

condition each of the predicted trajectories to correspond to one of the reference polylines;

use the plurality of predicted trajectories to plan one or more movements of the vehicle; and control the vehicle based on the planned one or more movements of the vehicle.

17. The non-transitory computer-readable storage medium system of claim 16, further comprising additional programming instructions that, when executed, will cause the processor to:

predict a waypoint, wherein the waypoint is a predicted position of the actor at a conclusion of a waypoint time period;

identify a segment of the reference polyline, the segment extending from a current location to a point along the reference polyline that is closest to the waypoint; and determine a first future trajectory state as a trajectory conditioned by the segment of the reference polyline.

18. The non-transitory computer-readable storage medium system of claim 16, wherein the instructions to use the plurality of predicted trajectories to plan movement of the vehicle comprise instructions to:

identify one or more combinations of locations and times where the first future trajectory state may intersect with a planned trajectory of the vehicle; and cause a motion subsystem of the vehicle to take an action that avoids the identified combinations of locations and times.

* * * * *